US010455076B1

(12) United States Patent
Kapadia et al.

(10) Patent No.: US 10,455,076 B1
(45) Date of Patent: Oct. 22, 2019

(54) CONFIGURABLE IN-VEHICLE TELETYPEWRITER (TTY) FUNCTIONALITY (71) Applicant: General Motors LLC, Detroit, MI (US)

(72) Inventors: Vinay Kapadia, Windsor (CA); David D. Malkan, Troy, MI (US); Amy Brogan Shiemke, Farmington, MI (US); Kevin W. Owens, Sterling Heights, MI (US); Daniel C. McGarry, Oxford, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 16/115,835

(22) Filed: Aug. 29, 2018

(51) Int. Cl.
H04W 4/48 (2018.01)
H04M 1/725 (2006.01)
H04W 4/40 (2018.01)
H04W 4/20 (2018.01)

(52) U.S. Cl.
CPC ... *H04M 1/72569* (2013.01); *H04M 1/72577* (2013.01); *H04W 4/20* (2013.01); *H04W 4/40* (2018.02); *H04W 4/48* (2018.02); *H04M 2242/24* (2013.01)

(58) Field of Classification Search
CPC .............. H04W 4/00; H04W 4/10–20; H04W 4/44–48
See application file for complete search history.

(56) References Cited

U.S. PATENT DOCUMENTS

| 2005/0256615 | A1* | 11/2005 | Wang ..................... G07C 5/008 701/1 |
| 2005/0277440 | A1* | 12/2005 | Van Bosch .......... H04B 1/3822 455/557 |
| 2011/0161000 | A1* | 6/2011 | Ross ..................... G01C 21/362 701/533 |
| 2012/0269330 | A1* | 10/2012 | Gouvia .............. G01C 21/3688 379/52 |
| 2013/0017800 | A1* | 1/2013 | Gouvia ................... H04W 4/90 455/404.1 |
| 2015/0365519 | A1* | 12/2015 | Ishfaq ................. H04M 1/6091 455/414.1 |

* cited by examiner

Primary Examiner — San Htun
(74) Attorney, Agent, or Firm — Reising Ethington P.C.; David Willoughby (57) ABSTRACT A system and method of carrying out a teletypewriter (TTY) call at a vehicle, the method being carried out by vehicle electronics of the vehicle, wherein the method includes: receiving a TTY configuration request at the vehicle electronics of the vehicle; configuring the vehicle to operate based on the TTY configuration request, wherein the configuring includes storing TTY configuration data at the vehicle; receiving a telephone call initiation request at the vehicle, the telephone call initiation request corresponding to a telephone call with an end user; determining whether TTY functionality is enabled or disabled at the vehicle, wherein the determination of whether the TTY functionality is enabled or disabled at the vehicle includes inspecting the TTY configuration data; and when it is determined that the TTY functionality is enabled at the vehicle, carrying out a TTY call at the vehicle.

20 Claims, 4 Drawing Sheets

CONFIGURABLE IN-VEHICLE TELETYPEWRITER (TTY) FUNCTIONALITY

INTRODUCTION

The present invention relates to teletypewriter (TTY) functionality provided by a vehicle.

Vehicles include hardware and software capable of obtaining and processing various information, including information that is obtained by vehicle system modules (VSMs). Many vehicles also include networking capabilities and can be connected to a vehicle backend server that maintains accounts for users and their vehicles, and that can be used to obtain data. Also, many vehicles can be integrated or connectable to telephones, such as cellular phones (or cell phones). Some individuals can be hard of hearing and cannot communicate effectively over a telephone that is controlled or operated at a vehicle, for example. Many vehicles are TTY-compatible in that additional physical devices can be provided after manufacturing of the vehicle so that the vehicle can offer TTY functionality.

SUMMARY

According to one aspect of the invention, there is provided a method of carrying out a teletypewriter (TTY) call at a vehicle, the method being carried out by vehicle electronics of the vehicle, wherein the method includes: receiving a TTY configuration request at the vehicle electronics of the vehicle; configuring the vehicle to operate based on the TTY configuration request, wherein the configuring includes storing TTY configuration data at the vehicle, wherein the configuring is automatically carried out by the vehicle electronics of the vehicle in response to receiving the TTY configuration request; receiving a telephone call initiation request at the vehicle, the telephone call initiation request corresponding to a telephone call with an end user; determining whether TTY functionality is enabled or disabled at the vehicle, wherein the determination of whether the TTY functionality is enabled or disabled at the vehicle includes inspecting the TTY configuration data; and when it is determined that the TTY functionality is enabled at the vehicle, carrying out a TTY call at the vehicle, wherein the TTY call includes: (i) displaying a TTY call user interface on a touch-screen display of the vehicle, the wherein the displaying of the TTY call user interface includes displaying an on-screen keyboard; (ii) receiving user text input at the touch-screen display based on detecting a user input at one or more keys of the on-screen keyboard; and (iii) sending the user text input to the end user over the telephone call.

According to various embodiments, this method may further include any one of the following features or any technically-feasible combination of some or all of these features:
 the TTY configuration request is received at the vehicle via TTY configuration input received at a vehicle-user interface;
 the vehicle-user interface is a touch-screen display included in the vehicle electronics of the vehicle;
 the telephone call initiation request is an indication of an incoming telephone call, and wherein the method further comprises the step of determining whether the incoming telephone call is a voice call or a TTY call in response to receiving the telephone call initiation request;
 when it is determined that the TTY functionality is enabled at the vehicle and when it is determining that the incoming telephone call is a TTY call, then carrying out the displaying step, the receiving step, and the sending step;
 the telephone call initiation request is a vehicle user call initiation request, and wherein the vehicle user call initiation request is a request to initiate a telephone call from the vehicle;
 the method further comprises the step of determining whether to carry out the telephone call with the end user, and wherein the displaying step, the receiving step, and the sending step are carried out in response to determining to carry out the telephone call with the end user;
 the telephone call is the TTY call, and wherein it is determined to carry out the TTY call based on a determination that the vehicle is in a TTY-uninhibited state or a TTY-inhibited state, and wherein the determination that the vehicle is in a TTY-inhibited state is made based on onboard vehicle sensor readings from one or more onboard vehicle sensors;
 the determination that the vehicle is in the TTY-uninhibited state or the TTY-inhibited state is made based on onboard vehicle sensor readings indicating that the vehicle is stopped.
 it is determined to carry out the TTY call regardless of whether the vehicle is in the TTY-uninhibited state or the TTY-inhibited state when an indication of a vehicle emergency is received at the vehicle;
 the user text input is sent over a voice call connection;
 carrying out the TTY call further includes sending a TTY indication to the end user; and/or
 the TTY indication is sent over a data connection that is separate from the voice call connection.

According to another aspect of the invention, there is provided a method of carrying out a teletypewriter (TTY) call at a vehicle, the method being carried out by vehicle electronics of the vehicle, wherein the method includes: receiving a TTY configuration request at the vehicle electronics of the vehicle; configuring the vehicle to operate based on the TTY configuration request, wherein the configuring includes storing TTY configuration data at the vehicle; receiving a vehicle user call initiation request at the vehicle, the vehicle user call initiation request indicating to start a TTY call process for carrying out a call with an end user; determining whether TTY functionality is enabled or disabled at the vehicle, wherein the determination of whether the TTY functionality is enabled or disabled at the vehicle includes inspecting the TTY configuration data; and when it is determined that the TTY functionality is enabled at the vehicle, carrying out a TTY call at the vehicle, wherein the TTY call includes: (i) sending a TTY indication to the end user via a data connection; and (ii) sending communications over a voice call connection that is separate from the data connection.

According to another aspect of the invention, there is provided a TTY-accessible vehicle electronic system for a vehicle, the TTY-accessible vehicle electronic system including: a telematics unit; a touch-screen display that is configured to display a TTY call user interface, wherein the TTY call user interface is a graphical user interface (GUI) that includes an on-screen keyboard; and a processor and memory, the memory storing computer instructions; wherein, when the processor executes the computer instructions, the TTY-accessible vehicle electronic system: (i) stores TTY configuration data in response to receiving a TTY configuration request, wherein the TTY configuration data is stored automatically by the TTY-accessible vehicle electronics system in response to the receiving of the TTY configuration request; (ii) determines whether the TTY functionality is enabled or disabled in response to a telephone call initiation request, wherein the determination of whether the TTY functionality is enabled or disabled includes inspecting the TTY configuration data; and (iii) when it is determined that the TTY functionality is enabled, carries out a TTY call, wherein the TTY call includes: (a) displaying the TTY call user interface on the touch-screen display, wherein the displaying of the TTY call user interface includes displaying the on-screen keyboard; (b) receiving user textual input at the touch-screen display based on detecting a user input at one or more keys of the on-screen keyboard; and (c) sending the user textual input to the end user over the telephone call using the telematics unit.

According to various embodiments, this TTY-accessible vehicle electronic system for a vehicle may further include any one of the following features or any technically-feasible combination of some or all of these features:

- a modem that is configured to convert audio signals or representations of audio signals into text and that is configured to convert text into audio signals or representations of audio signals;
- the modem is embodied in the computer instructions stored on the memory or in other computer instructions stored on other memory of the TTY-accessible vehicle electronic system;
- the modem includes dedicated hardware components;
- the processor and memory are included as a part of an infotainment unit; and/or
- the infotainment unit includes the telematics unit.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables a vehicle to carry out a teletypewriter (TTY) call with an end user, and enables a vehicle user to automatically configure the vehicle to operate in a TTY mode or in a non-TTY mode for purposes of carrying out telephone calls. In many embodiments, the system described below includes a TTY-accessible vehicle, which is a vehicle that is readily configurable between the TTY mode and the non-TTY mode—that is, the vehicle is manufactured as a TTY-accessible vehicle such that the TTY-accessible vehicle can be configured to operate in the TTY mode in response to a vehicle user input requesting the TTY mode. For example, the vehicle user can select an "Enable TTY Mode" menu option through navigating a menu presented on a touch-screen display of an infotainment module at the vehicle. When this "Enable TTY Mode" or other TTY enable configuration request is received at the vehicle, vehicle electronics (e.g., the infotainment module) of the vehicle can automatically configure the vehicle to operate in the TTY mode. In this way, TTY functionality can be enabled at the vehicle without the vehicle user having to obtain additional hardware or have a vehicle technician carry out additional configuration steps.

As mentioned above, in some scenarios, conventional systems require additional hardware components to be shipped or provided to vehicle users that elect to have their vehicle be capable of carrying out TTY calls. For example, when a vehicle user purchases a vehicle at a dealership, the vehicle may not be readily configurable to provide TTY functionality for the vehicle user. In such a scenario, the vehicle user can then request from the dealership (or OEM of the vehicle) to be provided with TTY-enabling hardware and/or request to have the dealership or other technician enable TTY functionality at their vehicle. This TTY-enabling hardware can be a separate tablet (or other electronic device) that is not (typically) included with the vehicle, but only provided to a vehicle user when they request to have their vehicle be capable of TTY functionality. As used herein, vehicles that are not readily or automatically configurable to be able to provide TTY functionality, but that require non-vehicle user steps (e.g., steps by a technician or a dealership) to enable the vehicle to provide TTY functionality are referred to as TTY-compatible vehicles. Also, as used herein, a TTY-accessible vehicle is a vehicle that is manufactured such that TTY functionality can automatically be configured (e.g., enabled, disabled) by vehicle electronics of the vehicle in response to a TTY configuration request.

Figure 1:
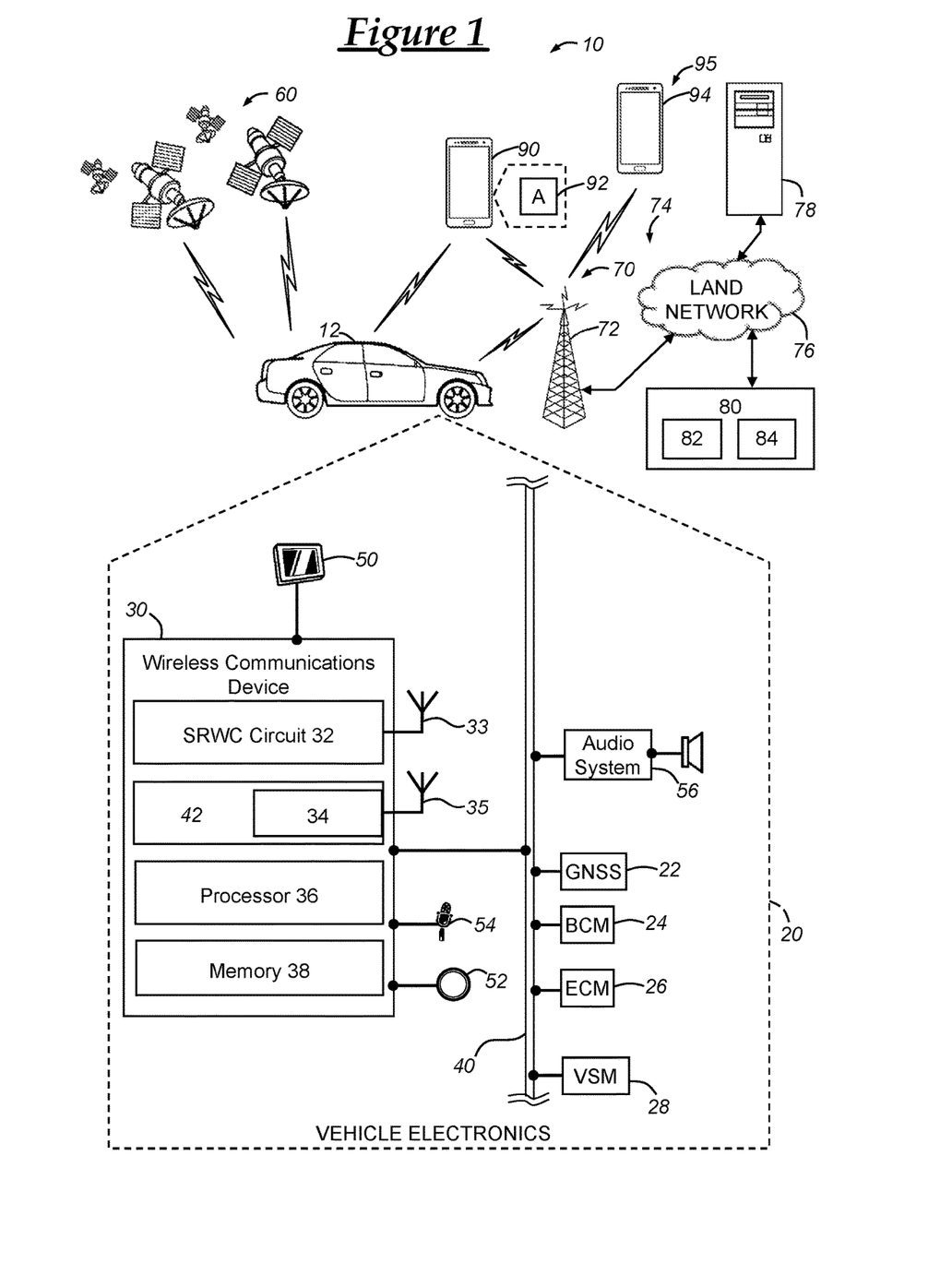
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12, a constellation of global navigation satellite system (GNSS) satellites 60, a remote communications network 74 including one or more wireless carrier systems 70 and a land communications network 76, a computer or server 78, a vehicle backend services facility 80, and an end user device 94. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, a wireless communications device 30, and vehicle-user interfaces 50-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, BCM 24, ECM 26, wireless communications device 30, a telematics unit 42 (shown in FIG. 1 as included as a part of the wireless communications device 30), and vehicle-user interfaces 50-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 can be connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via remote communications network 74 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives GNSS signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

The GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the wireless communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service. Also, new or updated map data can be downloaded to the GNSS receiver 22 from the remote facility 80 via the wireless communications device 30. In some embodiments, the GNSS receiver 22 may be integrated with or part of a center stack module (CSM) and/or integrated with the wireless communications device 30. Or, the GNSS receiver 22 may be a separate device that is connected to other VSMs via bus 40, as depicted in FIG. 1.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with the wireless communications device 30 and/or one or more vehicle system modules, such as the engine control module (ECM) 26, telematics unit 42, display 50, audio system 56, or other VSMs. The BCM 24 may include a processor and memory accessible by the processor. Suitable memory may include non-transitory computer-readable memory that includes various forms of RAM and ROM, such as those discussed below with respect to memory 38 of the wireless communications device 30.

Software stored in the memory and executable by the processor of the BCM enables the BCM to direct one or more vehicle functions or operations including, for example, controlling central locking, air conditioning (or other HVAC functionality), power mirrors, controlling the vehicle primary mover (e.g., engine, primary propulsion system), and/or controlling various other vehicle modules. The BCM 24 can receive a request to carry out a particular vehicle function from the wireless communications device 30 (or telematics unit 42) and, in response, the BCM 24 can send signals to other VSMs, such as a request to perform a particular operation or a request for vehicle sensor data. When the BCM 24 requests information from a sensor, the sensor may then send back the requested information, which can then be forwarded from the BCM 24 to another VSM, such as the wireless communications device 30. As mentioned above, the BCM 24 may receive data from VSMs, such as GNSS data or other navigation-related date from GNSS receiver 22, externally-received data from the wireless communications device 30, and various other information or data from other VSMs.

The BCM 24 can be used to detect a vehicle TTY-inhibited state, which is a vehicle state in which TTY services (e.g., a TTY call at the vehicle) are inhibited even though the TTY mode may be enabled. TTY calls involve inputting text using a keyboard (or other non-vocal input) and, in some cases, might lead to distracted driving. Thus, in at least some scenarios, it is be determined that the vehicle is being operated in a state in which TTY services should be inhibited. And, those scenarios or instances where it is be determined that the vehicle is being operated in a state in which TTY services should not be inhibited, and this can be referred to as a vehicle TTY-uninhibited state. In one embodiment, the vehicle TTY-inhibited state can be a vehicle state representing that the vehicle speed is above a particular threshold, such as zero miles per hour. Or, the vehicle TTY-inhibited state can be a vehicle state representing that the vehicle is in a drive gear or that the vehicle is in a powered on state (or an ignition on state) and not in a parking gear (or simply that the vehicle is not in a parking gear). And, thus, examples of vehicle TTY-uninhibited states include vehicle states when: the vehicle is in a parking gear, the vehicle is in a powered off state, the vehicle speed is zero (or below a particular threshold value), and the TTY vehicle input operator (i.e., the vehicle user that is operating the TTY call user interface) is not the driver of the vehicle (e.g., a passenger).

As used herein, a "powered on state" is a state of the vehicle in which the ignition or primary propulsion system of the vehicle is powered on or the accessory electronics of the vehicle is supplied with electrical power (e.g., the key of the vehicle is in an accessory (ACC) position). And, as used herein, a "powered off state" is a state of the vehicle in which the ignition or primary propulsion system of the vehicle is not powered on. Also, as used herein, an "ignition on state" is a powered on state in which the vehicle ignition is started, or in which a primary propulsion of the vehicle is initiated or started, such as in the cases of an electric vehicle. The determination of whether the vehicle is in a vehicle TTY-uninhibited state or a vehicle TTY-inhibited state can be made by the BCM 24 based on various onboard vehicle sensor signals. Or, in other embodiments, vehicle state information can be sent from the BCM 24 to other vehicle modules, such as the wireless communications device 30 or other VSMs 28, which can then make a determination as to whether the vehicle is in a vehicle TTY-uninhibited state or a vehicle TTY-inhibited state based on the vehicle state information.

Engine control module (ECM) 26 controls various aspects of engine operation, such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM 24 to power on the vehicle (i.e., switch the vehicle to a powered on state). Moreover, the ECM 26 is an onboard vehicle sensor that can be used to obtain vehicle sensor information of the vehicle engine, such as from an engine speed sensor, an engine temperature sensor, and an engine ignition timing sensor, all of which are also onboard vehicle sensors. In embodiments when the vehicle is a hybrid or electric vehicle, the ECM 26 can instead be another type of VSM that can be used to obtain status information regarding the primary mover (including electrical motor(s) and battery information).

The vehicle 12 includes various onboard vehicle sensors, as well as certain vehicle-user interfaces that can be utilized as onboard vehicle sensors. Generally, the sensors can obtain vehicle sensor data, which can include vehicle sensor values as measured or determined by the onboard vehicle sensor. For example, the ECM 26 can include or be communicatively coupled to various sensors, such as engine speed sensor, an engine temperature sensor, and an engine ignition timing sensor. Other information pertaining to either the operating state of the vehicle (the "vehicle operating state") or the environment of the vehicle (the "vehicle environmental state") can also be obtained or may be included in the vehicle sensor data. The vehicle sensor data can be sent to other VSMs, such as BCM 24 and the wireless communications device 30, via communications bus 40. Also, in some embodiments, the vehicle sensor data (or other vehicle data) can be sent with metadata, which can include data identifying the sensor (or type of sensor) that captured the vehicle sensor data, a timestamp (or other time indicator), and/or other data that pertains to the vehicle sensor data or vehicle sensor. The "vehicle operating state" refers to a state of the vehicle concerning the operation of the vehicle, which can include the operation of the primary mover (e.g., a vehicle engine, vehicle propulsion motors). The "vehicle environmental state" refers to a vehicle state concerning the interior of the cabin and the nearby, exterior area surrounding the vehicle. The vehicle environmental state includes information concerning a driver, operator, or passenger, as well as traffic conditions, roadway conditions and features, and statuses of areas nearby the vehicle.

Wireless communications device 30 is capable of communicating data via short-range wireless communications (SRWC). In one embodiment, the wireless communications device 30 is a central vehicle computer that is used to carry out at least part of the method discussed below. In the illustrated embodiment, wireless communications device 30 includes an SRWC circuit 32, a telematics unit 42 (including a cellular chipset 34), a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), BCM 24, display 50, an infotainment module, a head unit, and/or a gateway module. In one embodiment, the wireless communications device 30 can be or can include an infotainment unit that is operable to control or carry out at least part of an in-vehicle entertainment system that can be controlled through one or more vehicle-user interfaces, such as via touch-screen display 50, button 52, and/or microphone 54.

In one embodiment, the wireless communications device 30 includes the telematics unit 42 (or telematics control unit) (as shown in FIG. 1) that is capable of carrying out cellular communications using one or more cellular carrier systems 70. The telematics unit 42 can include the cellular chipset 34, software or firmware, processor, and memory. In one embodiment, the processor and/or memory of the telematics unit 42 can be shared with other VSMs or used for other functionality, such as for SRWC services which are carried out by the wireless communications device 30. For example, the telematics unit 42 can use the processor 36 and/or the memory 38 of the wireless communications device 30. Or, in other embodiments, a separate telematics unit can be included in the vehicle and communicatively coupled to the wireless communications device 30; this separate telematics unit can include the cellular chipset 34 as well as its own dedicated processor and memory (or these components can be shared with other VSMs). In one embodiment, the telematics unit can be integrated with the GNSS receiver 22 so that, for example, the GNSS receiver 22 and the wireless communications device 30 (or telematics unit 42) are directly connected to one another as opposed to being connected via communications bus 40.

In some embodiments, the wireless communications device 30 can be configured to communicate wirelessly according to one or more short-range wireless communications (SRWC) such as any of the Wi-Fi™, WiMAX™, Wi-Fi Direct™, IEEE 802.11p, other vehicle to vehicle (V2V) communication protocols, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit 32 may allow the device 30 to connect to another SRWC device, such as the handheld wireless device (HWD) 90 or other vehicles. For example, a Bluetooth™ connection between the HWD 90 and the SRWC circuit 32 can be used to carry out a hand-free call or a TTY call that uses the TTY call user interface provided by the vehicle, as discussed below. In cases where the telematics unit 42 is included in the wireless communications device 30, the wireless communications device 30 can be considered user equipment (UE) usable in carrying out cellular communications via cellular carrier system 70.

The telematics unit 42 and/or the wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 (and/or telematics unit 42) can be configured with a static IP address or can be set up to automatically receive an assigned IP address from another device on the network such as a router or from a network address server.

Packet-switched data communications may also be carried out via use of a cellular network that may be accessible by the device 30 via the telematics unit 42. The cellular chipset 34 can enable data to be communicated over the wireless (or cellular) carrier system 70. In such an embodiment, radio transmissions may be used to establish a communications channel, such as a voice channel 96 (FIG. 2) and/or a data channel 98 (FIG. 2), with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single telephone call over a voice channel and switch as needed between voice and data transmission over the voice channel, and this can be done using techniques known to those skilled in the art.

The telematics unit 42 can provide a remote data connection and a remote voice call connection to the vehicle. In one embodiment, the remote data connection can be used for vehicle services, such as reporting a TTY call indicator to a backend vehicle services facility, such as remote facility 80. And, in some embodiments, the remote data connection (or a separate remote data connection) can be used to provide services for a vehicle user, such as for providing the vehicle user with remote data connectivity so that the vehicle user can connect their HWD 90 (or other non-vehicle SRWC device) with remote networks. In such a case, the vehicle can provide this remote data connection to the vehicle user when the vehicle user (or the vehicle) is associated with an active remote data connectivity subscription.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 (and/or telematics unit 42) or can be shared with other vehicle systems. The processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives.

The wireless communications device 30 can provide an interface between various VSMs of the vehicle 12 and one or more devices external to the vehicle 12, such as one or more networks or systems at remote facility 80. This enables various vehicle operations to be carried out by "extra-vehicle" devices (or non-vehicle devices), including the vehicle backend services facility 80 and the HWD 90. For example, the wireless communications device 30 can connect to the HWD 90 so that telephone calls (e.g., typical telephone or audio voice calls, TTY calls) can be carried out using the vehicle-user interfaces. And, in another embodiment, a user can use an application 92 of the HWD 90 to configure vehicle user TTY preferences that can then be communicated to the vehicle via SRWCs and/or to the remote facility 80 via remote communications network 74.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information and that can obtain vehicle sensor data. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one particular embodiment, audio system 56 is operatively coupled to both vehicle bus 40 and an entertainment bus (not shown), and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art.

Visual display or touch-screen 50 is preferably a graphics display and can be used to provide a multitude of input and output functions. Display 50 can be a touch-screen on the instrument panel that is capable of graphically presenting a menu (e.g., a TTY call user interface) and capable of receiving input (e.g., TTY call input) from a vehicle user. In one embodiment, the display 50 can be integrated as a part of the wireless communications device 30, which can be (or can be part of) an infotainment module. In some embodiments, the vehicle can also include another display, such as a heads-up display reflected off of the windshield or a projector that can project graphics for viewing by a vehicle occupant. The display 50 can be included as a part of a center console of the vehicle, such as a center console entertainment system of the vehicle. Various other vehicle-user interfaces can also be utilized, as the interfaces of FIG. 1 are only an example of one particular implementation.

Remote communications network 74 provides for communications (e.g., data communications, voice or audio communications) between remote networks, and is depicted as including wireless carrier system 70 and land network 76. Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include the telematics unit 42 in vehicle 12 and/or the HWD 90). The carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art. The carrier system 70 can be used for establishing a voice call connection (or voice channel) (e.g., voice call connection 96, 96' (FIG. 2)) and/or a data connection (or data channel) (e.g., data connection 98 (FIG. 2)).

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown in FIG. 1) can be used for one or more purposes, such as for providing backend vehicle connectivity for the vehicle 12. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving vehicle sensor data (or other data), as well as setting up and/or configuring subscriber preferences or controlling vehicle functions; a TTY relay center that provides TTY relay services; a car sharing server which coordinates registrations from a plurality of users who request to use a vehicle as part of a car sharing service; or a third party repository to or from which vehicle sensor data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicle 12.

In at least one embodiment, the TTY relay services include conversion of textual communications of a TTY call to voice communications and/or conversion of voice communications to textual communications for a TTY call. The TTY relay services can be carried out programmatically using voice recognition and/or text-to-voice computer technology (e.g., a computer application), and/or through use of a TTY services technician (e.g., through typing received speech and/or speaking words received as a part of the TTY text communications). For example, a vehicle user can carry out a TTY call with the end user device 94 and, in some embodiments, the user of the HWD 94 (or "HWD end user") may desire to user voice communications. Thus, in one embodiment, the TTY call can be carried out through the TTY relay services provided by computer 78 so that the TTY vehicle user can receive text corresponding to words spoken by the HWD end user and the HWD end user can receive spoken words (or voice output) that is produced by the TTY relay services carried out by the computer 78.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers. And, in many embodiments, the remote facility 80 can include vehicle backend services servers 82 and databases 84, which may be stored on a plurality of memory devices. Also, the remote facility 80 can include one or more switches, one or more vehicle services advisors (including one or more TTY vehicle services advisors), emergency services, and/or an automated voice response system (VRS), all of which are known in the art.

Although the remote facility 80 is described as a vehicle backend services facility 80, the remote facility 80 (or other remote facility) can provide other services, such as emergency services. In the case of providing emergency services, the remote facility (or emergency services remote facility) can include one or more emergency advisors (including one or more TTY emergency advisors). And, in one embodiment, the remote facility 80 can provide TTY relay services, such as those discussed above with respect to computer 78.

The remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the databases 84 can store vehicle user TTY preference data, which is information specifying whether TTY functionality is enabled for a particular vehicle user.

The remote facility 80 can use the information stored in databases 84 to carry out one or more embodiments of the method(s) discussed herein, as well as various other vehicle backend services functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network or so that the operation of each facility is coordinated with the operation of the other facilities. And, the servers 82 can be used to provide information stored in the databases 84 to various other systems or devices, such as the vehicle 12.

The handheld wireless devices (HWDs) 90 and 94 are each a SRWC device (i.e., a device capable of SRWC) and may include: hardware, software, and/or firmware enabling cellular telecommunications and SRWC as well as other mobile device applications, such as a vehicle management application 92. The hardware of the HWDs 90, 94 may comprise: a processor and memory for storing the software, firmware, etc. The HWD processor and memory may enable various software applications, which may be preinstalled or installed by the user (or manufacturer) (e.g., having a software application or graphical user interface (GUI)). One implementation of the application 92 enables a vehicle user to communicate with the vehicle 12 and/or control various aspects or functions of the vehicle, some of which are listed above. Additionally, one or more applications may allow the user to connect with the remote facility 80 or call center advisors at any time. The application 92 can also provide a user interface for controlling various vehicle functionality.

In one particular embodiment, either or both of the HWDs 90, 94 can be a personal cellular SRWC device that includes a cellular chipset and/or cellular connectivity capabilities, as well as SRWC capabilities. Using a cellular chipset, for example, the HWD can connect with various remote devices, including computers 78 and remote server facility 80, via wireless carrier system 70. As used herein, a personal SRWC device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. In some embodiments, either or both of the HWDs 90, 94 are a personal SRWC device.

The processor of the HWDs 90, 94 can be any type of device capable of processing electronic instructions including microprocessors, microcontrollers, host processors, controllers, vehicle communication processors, and application specific integrated circuits (ASICs). The processor executes various types of digitally-stored instructions, such as software or firmware programs stored in memory of the HWDs 90, 94, which enable the devices 90, 94 to provide a wide variety of functionality. For instance, in one embodiment, the processor can execute programs (e.g., the vehicle management application 92) or process data. In some embodiments, the HWDs 90, 94 can be a smartphone or tablet that includes an operating system, such as Android™, iOS™, Microsoft Windows™, and/or other operating systems. The memory of the HWDs 90, 94 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), or magnetic or optical disc drives. In one embodiment, the memory of HWDs 90, 94 may be a non-volatile memory card, such as a Secure Digital™ (SD) card, that is inserted into a card slot of HWD 90.

The HWDs 90, 94 can also include a short range wireless communications (SRWC) circuit and/or chipset as well as one or more antennas, which allows it to carry out SRWC, such as any of the IEEE 802.11 protocols, Wi-Fi™, WiMAX™, ZigBee™, Wi-Fi Direct™ Bluetooth™, or near field communication (NFC). The SRWC circuit and/or chipset may allow the HWDs 90, 94 to connect to another SRWC device. Additionally, the HWDs 90, 94 can include a cellular chipset thereby allowing the device to communicate via one or more cellular protocols, such as GSM/GPRS technology, CDMA or CDMA2000 technology, and LTE technology. The HWDs 90, 94 may communicate data over wireless carrier system 70 using the cellular chipset and an antenna.

In many embodiments, the HWD 90 can be an HWD of a vehicle user and can include a vehicle management application 92, as depicted in the illustrated embodiment of FIG. 1. And, in many embodiments, the HWD 94 can be an HWD of an end user or a user that is remote from the vehicle 12. In some scenarios, the vehicle 12 can carry out a TTY call with the end user of the HWD 94. Although the end user 95 is depicted as using a HWD, the end user 95 can use any of a variety of telephonic or other telecommunications devices that are capable of placing a voice call, such as a landline telephone, digital telephones (including telephones using voice over Internet Protocol (IP)), cellular telephones, and radio telephones.

Figure 2:
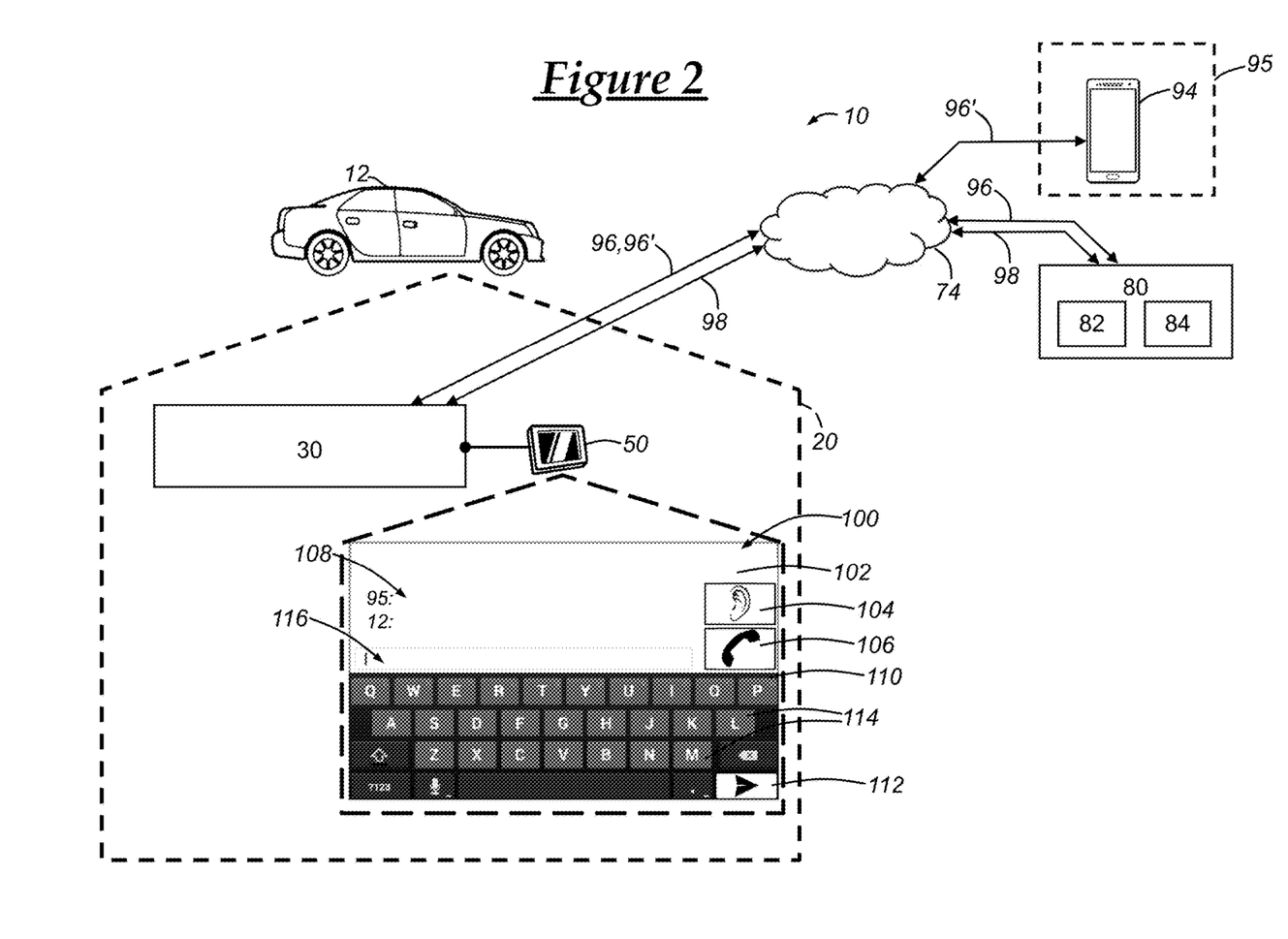
FIG. 2 is a block diagram depicting a portion of the communications system of FIG. 1.

With reference to FIG. 2, there is shown a portion of the communications system 10 being used for carrying out a TTY call using the vehicle. The illustrated embodiment depicts a voice call connection or path 96 and a data connection or path 98, each of which is established between the wireless communications device 30 and the remote facility 80. Additionally, the illustrated embodiment depicts a voice call connection or path 96' between the wireless communications device 30 and the end user HWD 94.

The illustrated embodiment of FIG. 2 also depicts an embodiment of a TTY call user interface 100 that can be presented on the touch-screen display 50. The TTY call user interface 100 can be initiated in response to the vehicle receiving a telephone call initiation request. The telephone call initiation request can be a request to initiate a telephone call from the vehicle (i.e., a "vehicle user call initiation request") or can be a request to answer a telephone call that is received at the vehicle (i.e., an "incoming telephone call"), as discussed more below. The TTY call user interface 100 can include a TTY main call screen 102, which can include a hearing mode button 104, an end/answer call button 106, a TTY call transcript 108, and a TTY keyboard 110. In some embodiments, the TTY keyboard 110 can be a digital keyboard that is used by the display 50 for other applications; in other embodiments, the TTY keyboard 110 can be a digital keyboard dedicated for TTY calls at the vehicle 12.

The TTY end/answer call button 106 can be used to answer a TTY call (or other telephone call) at the vehicle or end a telephone call at the vehicle. The TTY call transcript 108 is a transcript of the TTY communications between the vehicle user and the end user. The TTY call transcript 108 can be scrollable, as the entire conversation (or TTY communications) may not entirely be presentable within the area of the TTY call transcript 108 at a single time. The TTY keyboard 110 includes a send button 112, a plurality of keys 114, and a TTY input text field 116. In one embodiment, the TTY keyboard 110 can use a QWERTY configuration (as depicted in FIG. 2). When a user selects the send button 112, the vehicle electronics 20 can send a TTY communication textual message that contains the characters that are in the TTY input text field 116 at the time of selecting the send button 112. In one embodiment, the TTY hearing mode button 104 can allow a vehicle user to enable/disable a TTY hearing mode. The TTY hearing mode is a mode in which the vehicle audibly presents the communications of the TTY call using a vehicle-user interface, such as the audio system 56.

Figure 3:
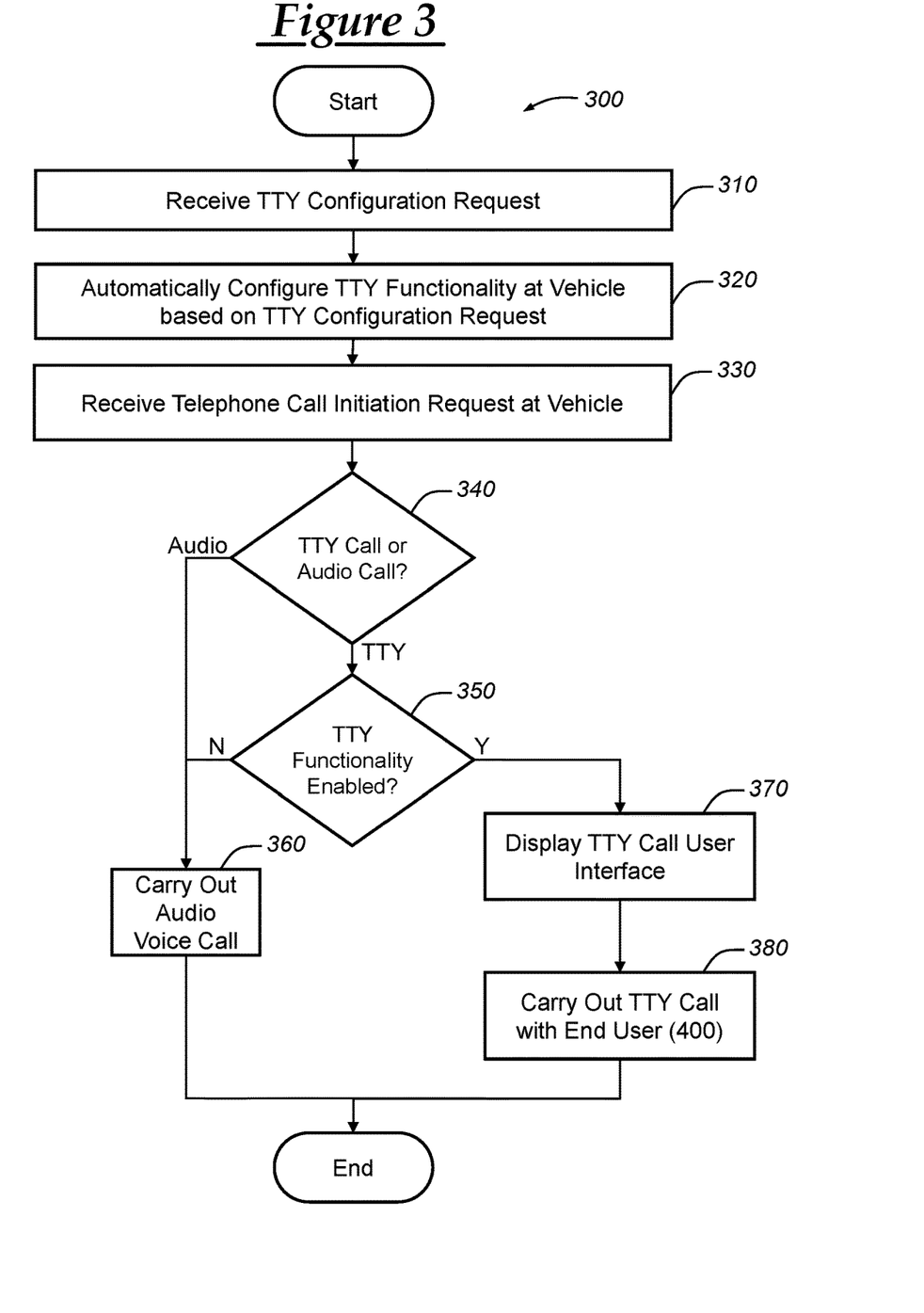
FIG. 3 is a flowchart of an embodiment of a method of carrying out a teletypewriter (TTY) call at a vehicle.

With reference to FIG. 3, there is shown an embodiment of a method 300 of method of carrying out a teletypewriter (TTY) call at a vehicle. In many embodiments, the method 300 can be carried out by the vehicle electronics 20 of the vehicle. And, in some embodiments, the method 300 can be carried out by the wireless communications device 30, or at least in part by the wireless communications device 30. Although the steps of the method 300 and the method 400 (FIG. 4) are described as being carried out in a particular order, it is hereby contemplated that the steps of the method 300 and the steps of the method 400 (FIG. 4) can be carried out in any technically feasible order as will be appreciated by those skilled in the art.

In a first scenario, a TTY call can be initiated by a vehicle user of the vehicle 12 and, in a second scenario, a TTY call can be initiated by an end user, such as the HWD end user (e.g., the end user of the HWD device 94), an emergency advisor at the remote facility 80, and/or a vehicle services advisor at the remote facility 80. These scenarios may be referred back to when describing the method 300 for providing exemplary descriptions of how the method 300 can be carried out for various scenarios; nonetheless, these are only exemplary scenarios for which the method 300 can be used, as those skilled in the art will recognize various other scenarios to which the method 300 can be applied or adapted.

The method 300 begins with step 310, wherein a TTY configuration request is received. In one embodiment, the TTY configuration request is a message or data that indicates a particular configuration for a vehicle with respect to TTY functionality. For example, the TTY configuration request can be a TTY configuration enable request, a TTY configuration disable request, or a TTY configuration settings request. The TTY configuration enable request is a request or an indication of a request to enable a TTY mode at the vehicle. The TTY configuration disable request is a request or an indication of a request to disable a TTY mode at the vehicle. The TTY configuration settings request is a request or an indication of a request to modify settings concerning the TTY mode of the vehicle, such as whether to use the hearing mode when starting a TTY call. In some embodiments, The TTY configuration request can also be specific to a particular vehicle user and, in one embodiment, the TTY configuration request can specify a particular vehicle user for which the TTY configuration request is associated with.

In some embodiments, the TTY configuration request can be received from a vehicle user via one or more vehicle user interfaces at the vehicle 12. In one embodiment, a user can navigate a graphical menu presented via the touch-screen display 50 and can provide input at the touch-screen display 50 that indicates a desire to modify TTY configurations at the vehicle. For example, the vehicle user can select an "Enable TTY Mode" menu item (e.g., graphical object displayed on the touch-screen display 50) and, thus, the vehicle 12 receives a TTY configuration enable request. In another example, the vehicle user can select a "Disable TTY Mode" menu item and, thus, the vehicle 12 receives a TTY configuration disable request. The method 300 then continues to step 320.

In step 320, the vehicle is configured to operate based on the TTY configuration request. In many embodiments, this step can be automatically carried out by the vehicle electronics 20 of the vehicle 12 in response to receiving the TTY configuration request. And, in many embodiments, this can include storing TTY configuration data at the vehicle 12, such as at the memory 38 of the wireless communications device 30. For example, a TTY enabled flag can be stored in the memory 38 of the wireless communications device 30. In some embodiments, the TTY functionality of the vehicle can be enabled/disabled and/or modified for particular users such that each vehicle user of the vehicle can have a personalized TTY configuration. For example, a first user can enable TTY functionality and a second user can disable TTY functionality. In such a case, the vehicle can identify (or determine) which user sent or is otherwise associated with the TTY configuration request and, then, the vehicle can store TTY configuration data that indicates the identified (and/or associated) vehicle user. The method 300 then continues to step 330.

In step 330, a telephone call initiation request is received at the vehicle. The telephone call initiation request can be a request to initiate a telephone call from the vehicle (a "vehicle user call initiation request"), can be receiving an incoming telephone call at the vehicle (an "incoming telephone call"), or a request to answer the incoming telephone call at the vehicle. In one embodiment, the telephone call initiation request is an incoming telephone call (e.g., an indication of an incoming telephone call), which can be received at the telematics unit 42 of the vehicle 12. The incoming telephone call can be a call placed by an end user, such as the end user 95 using HWD 94 or other telecommunications device.

In another embodiment, the telephone call initiation request is a vehicle user call initiation request, which can be a telephone call that is placed by the vehicle user through use of one or more vehicle-user interfaces or through use of the HWD 90. The telephone call is placed to an end user, such as the end user 95 or a call advisor at the remote facility 80. Once the telephone call initiation request is received at the vehicle, the method 300 continues to step 340.

In step 340, it is determined whether the telephone call is an audio voice call or a TTY call. An audio voice call can be a telephone call that presents audio from the telephone call to the vehicle-user and that does not use TTY services. A TTY call is a telephone call that uses TTY services, as discussed more below. In one embodiment, when the telephone call initiation request is a vehicle user call initiation request, this determination of step 340 can be made through determining whether the vehicle is in a TTY mode and/or whether the vehicle user placing the call is associated with a TTY mode. In such an embodiment, the determination of step 340 can be made after or in conjunction with the determination of step 350 as discussed below. For example, when the vehicle is in (or the vehicle user is associated with) the TTY mode, it can be determined that the TTY function is enabled and that a TTY call is being (or is to be) placed. Also, when the vehicle is in (or the vehicle user is associated with) the non-TTY mode, then it can be determined that the TTY function is disabled and that an audio voice call is being made or is to be made.

In another embodiment, when the telephone call initiation request is a vehicle user call initiation request, the vehicle can determine which type of call was placed through inspecting input received from the vehicle user. For example, in one embodiment, even at times when the TTY mode is enabled, the vehicle 12 may allow the vehicle user to select to place (or carry out) an audio voice call, such as through presenting an initiate audio voice call button on the touch-screen display 50 of the vehicle 12.

In yet another embodiment, when the telephone call initiation request is an incoming telephone call, the vehicle can determine whether a TTY call indicator is received. When a TTY call indicator is received, it can be determined that the telephone call is a TTY call and, when a TTY call indicator is not received, it can be determined that the telephone call is an audio voice call (or non-TTY call). The TTY call indicator is a message or data that is communicated from one user to another as a part of initiating a TTY call and that indicates that the telephone call is a TTY call, that a TTY call is requested, or that a TTY call can be carried out if desired. In one embodiment, the TTY call indicator can be communicated from the device placing the TTY call. Also, in some embodiments, the TTY call indicator can be communicated over a voice connection, such as the voice connection 96 (or 96'), or can be communicated over a data connection, such as data connection 98. In some embodiments, the TTY call indicator can be communicated with other data of the telephone call, such as information indicating the telephone's phone number that placed the call. When it is determined that the call is an audio voice call (or not a TTY call), the method 300 continues to step 360; otherwise, the method 300 continues to step 350.

In step 350, it is determined whether TTY functionality is enabled at the vehicle. In some embodiments, this can include determining whether the vehicle is in the TTY mode and/or whether the current vehicle user (e.g., current vehicle operator, current vehicle driver) is associated with the TTY mode. As mentioned above, when the vehicle is configured in response to a TTY configuration request, TTY configuration data can be stored at the vehicle that indicates whether the vehicle is in the TTY mode and/or whether a particular user has enabled (or is associated with) the TTY mode. Thus, this determination of step 350 can include recalling the TTY configuration data from a memory device of the vehicle, such as the memory 38 of the wireless communications device 30 (e.g., an infotainment unit). In one embodiment, this step can include: (1) determining the present vehicle user of the vehicle; (2) recalling TTY configuration data for the present user; and (3) determining whether the user-specific TTY configuration data that was recalled reflects that the TTY mode is (or is to be) enabled for the present user. When it is determined that the TTY functionality is enabled, the method 300 continues to step 370; otherwise, the method 300 can proceed to step 360 or the method 300 can end.

In step 360, an audio voice call is carried out at the vehicle. In one embodiment, the audio voice call is carried out using the telematics unit 42. The audio voice call can be carried out any of a number of telecommunications, such as voice over IP, cellular telecommunications, and/or other radio telecommunications. In one embodiment, step 360 can be carried out in response to determining that the TTY functionality is disabled, as discussed above with respect to step 350. In such an embodiment, after it is determined that the TTY functionality is not enabled (or disabled), the vehicle 12 can present a prompt to the vehicle user via a vehicle-user interface. This prompt can query the user as to whether the user desires to place an audio voice call and, when the user indicates a desire to place an audio voice call, the method 300 can proceed to step 360, where an audio voice call is placed. Additionally or alternatively, the prompt can query the user as to whether the user desires to enable the TTY mode and, when the user indicates a desire to enable the TTY mode, the TTY mode can be enabled (e.g., see steps 310 and 320) and the method 300 can proceed to step 370. In one embodiment, when the user indicates a desire or intention to place a TTY call at a time when the vehicle (or the user is associated with) a non-TTY mode, instead of prompting the user as to whether the user desires to enable the TTY mode, the vehicle 12 can automatically enable the TTY mode and proceed to step 370. In such a case, the TTY mode can be enabled for a single call, for all calls placed by the present user, or for all calls placed by the vehicle. In any of these scenarios, the vehicle can notify the vehicle user as to the action that the vehicle has taken (e.g., presenting a notification on display 50 that reads "TTY mode enabled for call"). After an audio voice call is carried out (in step 360), the method 300 can then end.

In step 370, a TTY call user interface is displayed at the vehicle. In many embodiments, the TTY call user interface (e.g., interface 100 (FIG. 2)) is displayed on the display 50 of the vehicle electronics 20. The TTY call interface can provide the vehicle user (or TTY user) with TTY call controls, including TTY input controls that include an on-screen keyboard 110 (with a send button 112 and keys 114), an end/answer call button 106, and a TTY call transcript 108. The method 300 then continues to step 380.

Figure 4:
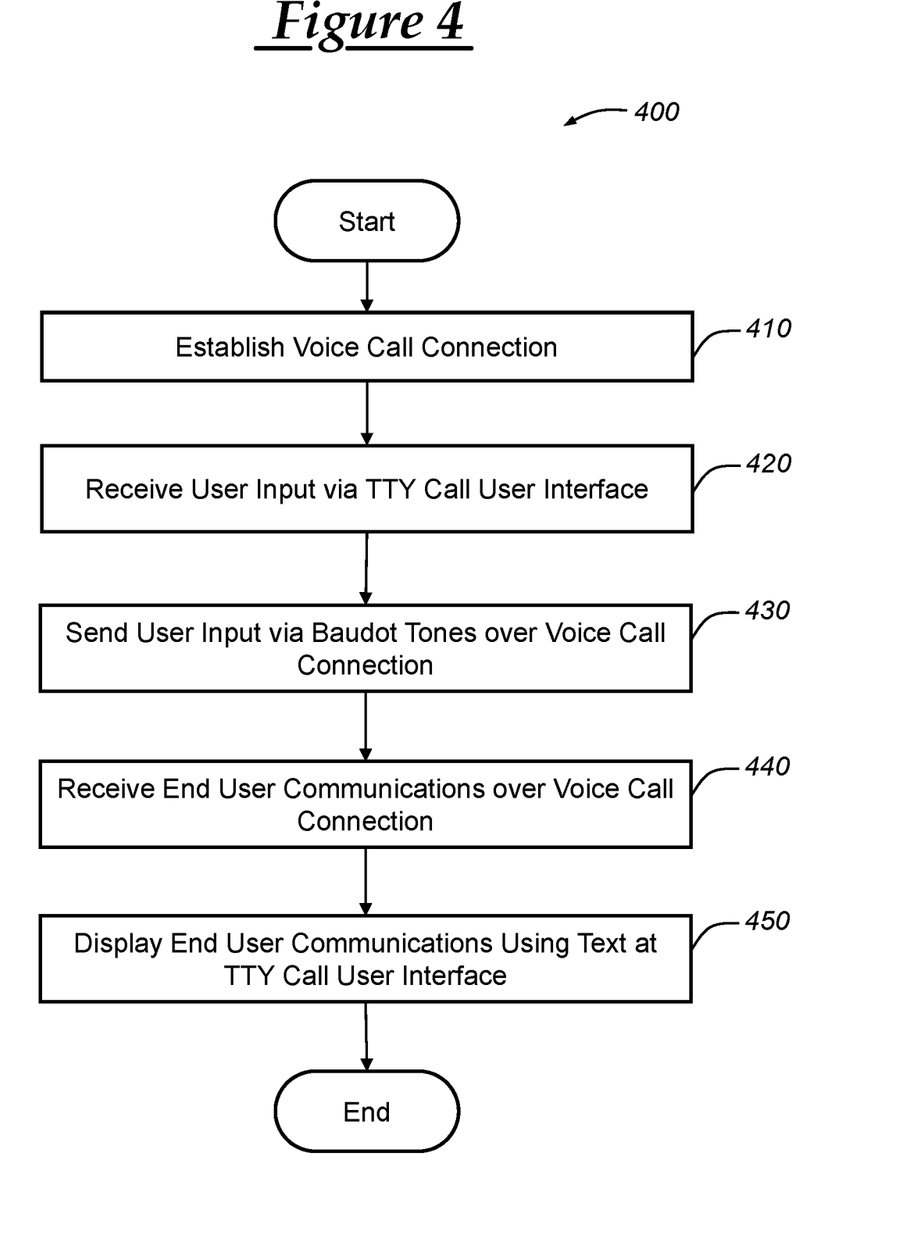
FIG. 4 is a flowchart of another embodiment of a method of carrying out a teletypewriter (TTY) call at a vehicle.

In step 380, a TTY call is carried out at the vehicle. Although step 380 is illustrated as being carried out after step 370, in other embodiments, step 370 can be carried out after or at the same time as step 380. With reference to FIG. 4, there is shown a method 400 of carrying out a TTY call at the vehicle. The method 400 begins with step 410, where a voice call connection is established. A voice call connection uses a wireless voice channel to carry out a telephone call. In one embodiment, the voice call connection can be a particular radio frequency channel that is dedicated to (or used primarily for) voice communications as opposed to data communications. The voice call connection can then be used for sending audio signals (e.g., Baudot tones) that are used to convey text communications inputted by the vehicle user at the TTY call user interface.

In one embodiment, in addition to establishing a voice call connection, a data connection can be established with a device of the end user. For example, when a TTY call is being placed to an advisor at the remote facility 80 using a voice channel, a data connection can be established as well, such as data connection 98 (FIG. 2). In such a case, the data connection can be used to send a TTY call indicator that indicates that the incoming call is a TTY call. In one embodiment, this TTY call indicator can be received at a computer (e.g., server 82) at the remote facility 80 and can be used to indicator to the remote facility 80 that the incoming call should be answered (or taken by) a TTY call user, which is a user (e.g., advisor) that is capable of carrying out a TTY call (e.g., includes a modem for carrying out TTY calls). For example, when the remote facility 80 receives the TTY call indicator, the remote facility 80 can direct the incoming call (or communications conveyed over the voice channel) to a TTY system and/or a TTY user. The data connection and/or the sending of the TTY call indicator from the vehicle can be carried out prior to establishing the voice connection, at the same time (or overlapping times) as establishing the voice connection, and/or after establishing the voice connection. In one embodiment, the TTY call may be rejected and/or not answered and, thus, the call may be terminated at the vehicle and the method 400 (and the method 300) then ends. The method 400 continues to step 420.

In step 420, user input is received at the TTY call user interface. As mentioned above, in many embodiments, the TTY call user interface can be a graphical user interface (GUI) that is presented on the display 50 of the vehicle 12. The vehicle user can interact with the TTY call user interface 100 (FIG. 2) through pressing one or more on-screen keys 114 of the on-screen keyboard 110. For example, a user can select a series of keys 114 (e.g., "h", "e", "l", "l", "o") to input the message "hello" into the TTY input text field 116. Then, once the user selects the send button 112, the message "hello" is then sent over the voice call. Other methods of input can be used as well. The method 400 continues to step 430.

In step 430, the user input is sent over the established voice call connection (or voice channel). As mentioned above, once the vehicle user enters text into the TTY input text field 116 and then presses the send button 112, the entered (or inputted) text is sent over the voice call connection or voice channel. In one embodiment, the text can be converted to Baudot tones and sent over the voice call connection 96, 96' using the telematics unit 42.

In one embodiment, the vehicle 12 can include a modem (i.e., modulator/demodulator) that modulates text (or a series of characters) over or using audio signal(s), such as Baudot tones, and that demodulates audio signal(s) (or electromagnetic signals representing audio signals) into text (or a series of characters). This modem can include a hardware module or circuit that is incorporated into the vehicle electronics 20 at the time of manufacture. Alternatively or additionally, in some embodiments, this modem can be embodied in software that is included as a part of the wireless communications device 30, telematics unit 42, infotainment unit, or other VSM of the vehicle electronics 20. In this way, the vehicle 12 is manufactured to be equipped with the modem regardless of whether the TTY mode is ever enabled. And, as discussed above, this integrated modem (and/or TTY capabilities) provides for a TTY-accessible vehicle that is readily capable of carrying out TTY calls using components of the vehicle electronics 20 (as initially manufactured (at least in some embodiments)). The method 400 continues to step 440.

In step 440, end user communications are received over the voice call connection (or voice channel). In one embodiment, the end user can send text using a TTY device in a similar way as the vehicle user can as described above in step 430. For example, the end user can enter text into a TTY call user interface and the text can then be converted to an audio signal (e.g., Baudot tones) and then communicated over the voice call connection 96, 96' using the remote communications network 74. The vehicle 12 can then receive the end user communications (or end user message(s)) at the telematics unit 42, and then can convert (or demodulate) the audio signals (e.g., Baudot tones) into text. The method 400 continues to step 450.

In step 450, the end user communications are displayed at the TTY call user interface. In one embodiment, after the audio signals conveying the end user communications are demodulated into text at the vehicle 12 using the vehicle electronics 20, the text can be displayed on the display 50 at the TTY call transcript 108. In one embodiment, the TTY call transcript 108 can display both the communications entered (or inputted) and sent from the vehicle user to the end user as well as the end user communications that are received at the vehicle 12. The messages can be displayed on the TTY call transcript 108 based on when they are received or sent with, for example, the most recent message on the bottom. A user can swipe up and down on an area corresponding to the TTY call transcript 108 of the TTY call user interface 100 to scroll through the messages of the TTY call. It should be appreciated that the steps 420 through 450 can be carried out in any suitable order, and may be repeated numerous times for a single TTY call. The method 400 and the method 300 then end.

In other embodiments, the TTY call indicator can be communicated over a voice channel or a voice call connection and, in such embodiments, a separate data connection may not be established. And, in other embodiments, the TTY call can be carried out using Voice over IP (VoIP), which can also be used to send the TTY call indicator. In other embodiments, the TTY call can be carried out (or determined to be carried out) based on a determination that the vehicle is in a TTY-inhibited state (or TTY-uninhibited state). And, further, in some embodiments, the determination that the vehicle is in a TTY-inhibited state (or TTY-uninhibited state) is made based on onboard vehicle sensor readings from one or more onboard vehicle sensors. And, even further, in some embodiments, the determination that the vehicle is in a TTY-inhibited state (or TTY-uninhibited state) is made based on onboard vehicle sensor readings indicating that the vehicle is stopped.

In another embodiment, the vehicle can receive an indication of a vehicle emergency, which is any indication of an emergency situation involving the vehicle or at the vehicle. For example, this indication can be received from a VSM of the vehicle (e.g., the BCM 24) that detects a crash or collision via one or more onboard vehicle sensors. Or, in another embodiment, this indication can be received via a vehicle-user interface, such as through microphone 54 or display 50. In one embodiment, the vehicle can determine to carry out the TTY call regardless of whether the vehicle is in the TTY-inhibited state when an indication of a vehicle emergency is received at the vehicle.

In one embodiment, the method 300, the method 400, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory 38), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of carrying out a teletypewriter (TTY) call at a vehicle, the method being carried out by vehicle electronics of the vehicle, wherein the method comprises:

receiving a TTY configuration request at the vehicle electronics of the vehicle;

configuring the vehicle to operate based on the TTY configuration request, wherein the configuring includes storing TTY configuration data at the vehicle, wherein the configuring is automatically carried out by the vehicle electronics of the vehicle in response to receiving the TTY configuration request;

receiving a telephone call initiation request at the vehicle, the telephone call initiation request corresponding to a telephone call with an end user;

determining whether TTY functionality is enabled or disabled at the vehicle, wherein the determination of whether the TTY functionality is enabled or disabled at the vehicle includes inspecting the TTY configuration data, including determining that the vehicle is in a TTY-uninhibited state or a TTY-inhibited state, and wherein the determination that the vehicle is in a TTY-inhibited state is made based on onboard vehicle sensor readings from one or more onboard vehicle sensors; and when it is determined that the TTY functionality is enabled at the vehicle, carrying out a TTY call at the vehicle, wherein the TTY call includes:

displaying a TTY call user interface on a touch-screen display of the vehicle, the wherein the displaying of the TTY call user interface includes displaying an on-screen keyboard;

receiving user text input at the touch-screen display based on detecting a user input at one or more keys of the on-screen keyboard; and sending the user text input to the end user over the telephone call.

2. The method of claim 1, wherein the TTY configuration request is received at the vehicle via TTY configuration input received at a vehicle-user interface.

3. The method of claim 2, wherein the vehicle-user interface is a touch-screen display included in the vehicle electronics of the vehicle.

4. The method of claim 1, wherein the telephone call initiation request is an indication of an incoming telephone call, and wherein the method further comprises the step of determining whether the incoming telephone call is a voice call or a TTY call in response to receiving the telephone call initiation request.

5. The method of claim 4, wherein when it is determined that the TTY functionality is enabled at the vehicle and when it is determining that the incoming telephone call is a TTY call, then carrying out the displaying step, the receiving step, and the sending step.

6. The method of claim 1, wherein the telephone call initiation request is a vehicle user call initiation request, and wherein the vehicle user call initiation request is a request to initiate a telephone call from the vehicle.

7. The method of claim 6, wherein the method further comprises the step of determining whether to carry out the telephone call with the end user, and wherein the displaying step, the receiving step, and the sending step are carried out in response to determining to carry out the telephone call with the end user.

8. The method of claim 7, wherein the telephone call is the TTY call, and wherein it is determined to carry out the TTY call based on the determination that the vehicle is in the TTY-uninhibited state or the TTY-inhibited state.

9. The method of claim 1, wherein the determination that the vehicle is in the TTY-uninhibited state or the TTY-inhibited state is made based on onboard vehicle sensor readings indicating that the vehicle is stopped.

10. The method of claim 9, wherein it is determined to carry out the TTY call regardless of whether the vehicle is in the TTY-uninhibited state or the TTY-inhibited state when an indication of a vehicle emergency is received at the vehicle.

11. The method of claim 10, wherein the user text input is sent over a voice call connection.

12. The method of claim 11, wherein carrying out the TTY call further includes sending a TTY indication to the end user.

13. The method of claim 12, wherein the TTY indication is sent over a data connection that is separate from the voice call connection.

14. A method of carrying out a teletypewriter (TTY) call at a vehicle, the method being carried out by vehicle electronics of the vehicle, wherein the method comprises:
receiving a TTY configuration request at the vehicle electronics of the vehicle;
configuring the vehicle to operate based on the TTY configuration request, wherein the configuring includes storing TTY configuration data at the vehicle;
receiving a vehicle user call initiation request at the vehicle, the vehicle user call initiation request indicating to start a TTY call process for carrying out a call with an end user;
determining whether TTY functionality is enabled or disabled at the vehicle, wherein the determination of whether the TTY functionality is enabled or disabled at the vehicle includes inspecting the TTY configuration data, including determining that the vehicle is in a TTY-uninhibited state or a TTY-inhibited state, and wherein the determination that the vehicle is in a TTY-inhibited state is made based on onboard vehicle sensor readings from one or more onboard vehicle sensors; and
when it is determined that the TTY functionality is enabled at the vehicle, carrying out a TTY call at the vehicle, wherein the TTY call includes:
sending a TTY indication to the end user via a data connection; and
sending communications over a voice call connection that is separate from the data connection.

15. A teletypewriter TTY-accessible vehicle electronic system for a vehicle, the TTY-accessible vehicle electronic system comprising:
a telematics unit;
a touch-screen display that is configured to display a TTY call user interface, wherein the TTY call user interface is a graphical user interface (GUI) that includes an on-screen keyboard; and
a processor and memory, the memory storing computer instructions;
wherein, when the processor executes the computer instructions, the TTY-accessible vehicle electronic system:
stores TTY configuration data in response to receiving a TTY configuration request, wherein the TTY configuration data is stored automatically by the TTY-accessible vehicle electronics system in response to the receiving of the TTY configuration request;
determines whether the TTY functionality is enabled or disabled in response to a telephone call initiation request, wherein the determination of whether the TTY functionality is enabled or disabled includes inspecting the TTY configuration data, including determining that the vehicle is in a TTY-uninhibited state or a TTY-inhibited state, and wherein the determination that the vehicle is in a TTY-inhibited state is made based on onboard vehicle sensor readings from one or more onboard vehicle sensors; and
when it is determined that the TTY functionality is enabled, carries out a TTY call, wherein the TTY call includes:
displaying the TTY call user interface on the touch-screen display, wherein the displaying of the TTY call user interface includes displaying the on-screen keyboard;
receiving user textual input at the touch-screen display based on detecting a user input at one or more keys of the on-screen keyboard; and
sending the user textual input to the end user over the telephone call using the telematics unit.

16. The TTY-accessible vehicle electronic system of claim 15, further comprising a modem that is configured to convert audio signals or representations of audio signals into text and that is configured to convert text into audio signals or representations of audio signals.

17. The TTY-accessible vehicle electronic system of claim 16, wherein the modem is embodied in the computer instructions stored on the memory or in other computer instructions stored on other memory of the TTY-accessible vehicle electronic system.

18. The TTY-accessible vehicle electronic system of claim 16, wherein the modem includes dedicated hardware components.

19. The TTY-accessible vehicle electronic system of claim 18, wherein the processor and memory are included as a part of an infotainment unit.

20. The TTY-accessible vehicle electronic system of claim 19, wherein the infotainment unit includes the telematics unit.

\* \* \* \* \*